(12) United States Patent  
Marban et al.

(10) Patent No.: US 9,200,735 B2
(45) Date of Patent: Dec. 1, 2015

(54) DIELECTRIC FITTING

(75) Inventors: Joseph Marban, Newbury Park, CA (US); Jeff Lowell, Ventura, CA (US)

(73) Assignee: Parker-Hannifin Corporation, Cleveland, OH (US)

( * ) Notice: Subject to any disclaimer, the term of this patent is extended or adjusted under 35 U.S.C. 154(b) by 1611 days.

(21) Appl. No.: 11/846,737

(22) Filed: Aug. 29, 2007

(65) Prior Publication Data

US 2008/0169643 A1    Jul. 17, 2008

Related U.S. Application Data

(60) Provisional application No. 60/884,642, filed on Jan. 12, 2007.

(51) Int. Cl.
*F16L 25/03* (2006.01)

(52) U.S. Cl.
CPC ...................... *F16L 25/03* (2013.01)

(58) Field of Classification Search
USPC ........ 285/48, 50, 53, 54, 222.1, 222.2, 222.3, 285/222.4, 222.5, 331
See application file for complete search history.

(56) References Cited

U.S. PATENT DOCUMENTS

| | | | | |
|---|---|---|---|---|
| 1,871,371 | A | * | 8/1932 | Jackson .................. 403/202 |
| 3,454,287 | A | * | 7/1969 | Thiessen .................. 285/50 |
| 3,871,687 | A | * | 3/1975 | Dockree .................. 285/53 |
| 3,993,331 | A | * | 11/1976 | Schwarz .................. 285/53 |
| 4,011,652 | A | * | 3/1977 | Black .................. 29/455.1 |
| 4,238,639 | A | * | 12/1980 | Palmieri .................. 174/73.1 |
| 4,398,754 | A | * | 8/1983 | Caroleo et al. .................. 285/45 |
| 4,522,889 | A | | 6/1985 | Ebneth et al. |
| 4,630,789 | A | | 12/1986 | Rosenberg |
| 4,824,147 | A | | 4/1989 | De Gruijter |
| 5,114,190 | A | | 5/1992 | Chalmers |
| 5,664,809 | A | | 9/1997 | Bates |

* cited by examiner

*Primary Examiner* — Daniel P Stodola
*Assistant Examiner* — James Linford
(74) *Attorney, Agent, or Firm* — Renner, Otto, Boisselle & Sklar, LLP

(57) ABSTRACT

A dielectric tubular fitting for dissipating electrical energy, while providing fluid flow therethrough, the fitting including a non-metallic reinforced hose extending between and fluidly interconnecting spaced metallic tubes, and a means within the hose for providing controlled electrical resistance to dissipate positive charge of fluid flowing through the fitting. A dielectric cover is provided surrounding and encapsulating the hose, and at least partially encapsulating each of the tubes.

6 Claims, 1 Drawing Sheet

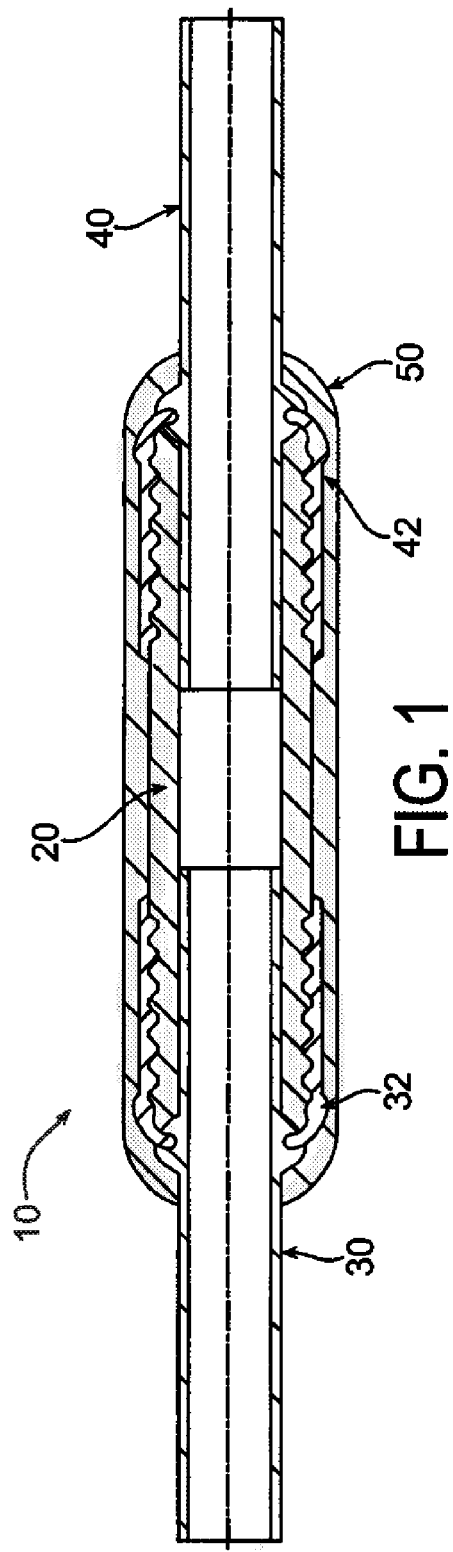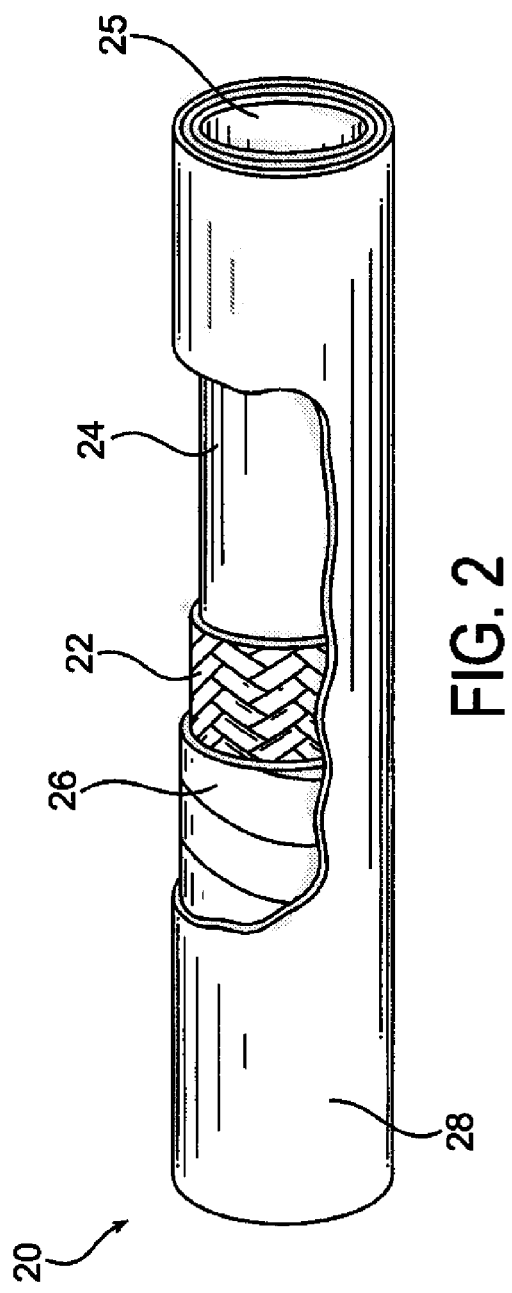

DIELECTRIC FITTING

CROSS-REFERENCE TO RELATED CASES

The present application claims the benefit of U.S. Provisional Patent Application Ser. No. 60/884,642, filed Jan. 12, 2007, the disclosure of which is incorporated herein by reference.

TECHNICAL FIELD

The present invention pertains to tubular dielectric fittings for use in applications such as gas to gas, liquid to liquid, gas/liquid to gas/liquid and the like. These dielectric fittings include bulkhead types that are designed to extend through the bulkhead of a vessel, such as an aircraft, and also include in-line types that permit pressurized fluid to travel from side to side.

BACKGROUND OF THE INVENTION

Dielectric fittings are known in the art and have found use in many applications, ranging from natural gas pipelines, where they isolate monitoring instruments from the effects of electrical current and interrupt cathodic current flow while permitting fluid flow, to providing a conduit for transferring liquid through an aircraft bulkhead. In the latter usage, the dielectric fitting contains integral fitting connections on both sides of the aircraft bulkhead that permit connections of tubes, hoses, or other fluid-carrying components. Such a dielectric fitting also provides a high electrical resistance path that limits electrical current flow between the two fitting connections but allows for the gradual dissipation of p-static charge. If the fluid has conductive properties that allow it to dissipate static charge the dielectric will need to provide only a very high electrical resistance approaching that of a non-conductor.

Thus, the primary function of a dielectric fitting, also referred to as a static dissipative hydraulic isolator fitting, is to dissipate the electrical energy from static charges caused in part by fluid movements and the indirect effects of lightning, at such an occurrence. These fittings have the equally important secondary function of providing a safe fluid passage for the fluid passing through the fuel tank or other areas of the aircraft.

SUMMARY

At least one embodiment of the invention provides a dielectric fitting comprising a non-metallic hose extending between and fluidly interconnecting a first metallic tube and a remote second metallic tube, the hose including a reinforcing material and an inner liner, with a means within the hose for providing controlled electrical resistance to dissipate positive charge of fluid flowing through the tube assembly, and a rigid, dielectric cover surrounding and encapsulating the hose, and at least partially encapsulating each of the tubes.

At least one embodiment of the invention provides a dielectric fitting comprising: a non-metallic hose extending between and fluidly interconnecting a first metallic tube and a remote second metallic tube, the hose including a reinforcing material and an inner liner, the inner liner including a carbon layer providing controlled electrical resistance to dissipate positive charge of fluid flowing through the dielectric fitting, and a rigid, dielectric cover surrounding and encapsulating the hose, and at least partially encapsulating each of the tubes; the glass fiber isolator forming the radially outermost layer of the dielectric fitting.

At least one embodiment of the invention provides a dielectric fitting comprising: a first metallic tube including a socket having a socket end fixed to the first metallic tube; a remote second metallic tube including a socket having a socket end fixed to the first metallic tube; a reinforced non-metallic hose having a first end attached to the socket of the first metallic tube and a second end attached to the socket of the second metallic tube, the hose extending between and fluidly interconnecting the first metallic tube and the second metallic tube, the tube having an inner liner, the inner liner including a carbon layer providing controlled electrical resistance to dissipate positive charge of fluid flowing through the dielectric fitting; a rigid, dielectric cover surrounding and encapsulating the hose and the sockets of the tubes, and at least partially encapsulating each of the tubes.

BRIEF DESCRIPTION OF THE DRAWING

Embodiments of this invention will now be described in further detail with reference to the accompanying drawing, in which:

FIG. 1 is a longitudinal cross-sectional view of an embodiment of a dielectric fitting in accordance with the present invention; and FIG. 2 is a partial cutaway perspective view a standard hose used as a portion of the embodiment shown in FIG. 1.

DETAILED DESCRIPTION OF THE DRAWINGS

Referring now to FIG. 1, an embodiment of dielectric fitting of the invention is shown and designated at 10. In a typical application, the dielectric fitting provides a conduit for transferring fluid through an aircraft bulkhead (not shown). Dielectric fitting 10 comprises a non-metallic reinforced hydraulic hose 20 or isolator, extending between and fluidly interconnecting a first tube 30 and a remote second tube 40. In one embodiment of the invention, the axial distance between the tubes 30, 40 is typically in a range of 0.5 to 3 inches depending on voltage potential and the fluid medium dielectric strength. The tubes 30, 40 are typically made of a metallic material such as Titanium alloy or Stainless Steel or any suitable material. The tubes 30, 40 each may include a metal socket 32, 42 receiving each respective end of the hose 20, the sockets 32, 42 having an end fixed to a respective tube. The dielectric fitting 10 further comprises a dielectric cover 50 surrounding and encapsulating the hose 20 between the tubes 30, 40, and at least partially encapsulating each of the tubes 30, 40. The dielectric cover may be a filament wound glass fiber with a resin matrix material as shown in FIG. 1, or any other suitable material having similar properties.

Referring to FIG. 2, a typical hose 20 that may be used in an embodiment of the invention is shown. Hose 20 comprises an inner liner 24, a reinforcement layer 22, a barrier layer 26, and a cover layer 28. The inner liner 24 of the hose 20 can be constructed from various materials such as PTFE (Teflon®), rubber, or silicon, and is shown herein as seamless extruded PTFE. The inner liner 24 of the hose 20 includes a means 25 for providing controlled electrical resistance to dissipate positive charge of fluid flowing through the dielectric fitting 10. The means 25 providing controlled electrical resistance includes a thin carbon layer 25 applied to the inner liner 24 of hose 20. The thin carbon layer 25 provides a conductive path that can dissipate any static charge build-up due to rapidly flowing fuels or other liquids through the hose assembly 20.

The reinforcement layer 22 may be any known, non-metallic reinforcement material and is shown herein as a para-aramid fiber reinforcement. The barrier layer 26 may be formed of any appropriate non-metallic material and is shown herein constructed of PTFE wrap for providing corrosion and moisture resistance. Additionally, cover layer 28 may be formed of any appropriate non-metallic material and is shown herein constructed of black polyester. Hoses not having a barrier layer or a cover layer or both are also contemplated and the invention in not intended to be limited to the construction shown in this embodiment.

In an aircraft bulkhead application, the tubes 30, 40 provide integral fitting connections on both sides of the aircraft bulkhead that permit connections of tubes, hoses, or other fluid carrying components. The dielectric fitting 10 also provides a high electrical resistance path that limits electrical current flow between the two fittings but allows for gradual dissipation of p-static charge. The exact electrical conductivity value for the inner hose liner can be adjusted to meet specific user requirements. The dielectric fitting electrical conductivity depends on many factors, such as the conductivity of the flowing medium, the fluid flow rate (creating charge), and the indirect lightning electrical environment. To resist the forces induced on the dielectric fitting, a filament wound glass fiber is placed around the hose, which itself is contained within the isolator. This wound glass fiber is captured using a resin matrix material that glues the glass fiber to itself, to the outer part of the hose, and to the metal tube ends and the associated sockets. The solidified resin turns the dielectric fitting structure into a rigid member capable of reacting to vehicle induced moments, torques, and vibration environments. Brackets can be added to accommodate the installation of the dielectric fitting on to a vehicle or structure. These brackets can be constructed from metal or composite material, as needed. The port ends can be configured to support all standard fitting ends available in commercial, industrial, and aerospace applications, as well as non-standard configuration styles.

What is claimed is:

1. A dielectric fitting comprising:
   a first metallic tube including a socket having an end fixed to the first metallic tube;
   a remote second metallic tube including a socket having an end fixed to the second metallic tube;
   a reinforced non-metallic hose having a first end attached to the socket of the first metallic tube and a second end attached to the socket of the second metallic tube, the hose extending between and fluidly interconnecting the first metallic tube and the second metallic tube, the non-metallic hose having an inner liner, the inner liner including a carbon layer providing controlled electrical resistance to dissipate positive charge of fluid flowing through the dielectric fitting;
   a dielectric cover completely surrounding and encapsulating the non-metallic hose and the sockets of the tubes, and at least partially encapsulating and in direct contact with each of the metallic tubes; and
   the fitting does not include any O-ring seals.

2. The dielectric fitting as in claim 1, wherein the dielectric cover is a wound glass fiber in a resin matrix material.

3. The dielectric fitting as in claim 1, wherein the dielectric cover forms the radially outermost layer of the dielectric fitting.

4. The dielectric fitting as in claim 1, wherein the reinforcing material is a para-aramid fiber.

5. The dielectric fitting as in claim 1, wherein the axial distance between the metallic tubes is in a range of 0.5 to 3 inches.

6. The dielectric fitting as in claim 1, wherein the metallic tubes are Titanium alloy or Stainless Steel.

\* \* \* \* \*